US007390865B2

(12) United States Patent
Hamamoto et al.

(10) Patent No.: US 7,390,865 B2
(45) Date of Patent: Jun. 24, 2008

(54) PROCESS FOR PRODUCING WATER-SOLUBLE CARBOXYLATED POLYMER

(75) Inventors: Shigeki Hamamoto, Himeji (JP); Masatoyo Yoshinaka, Himeji (JP)

(73) Assignee: Sumitomo Seika Chemicals Co., Ltd., Hyogo (JP)

( * ) Notice: Subject to any disclaimer, the term of this patent is extended or adjusted under 35 U.S.C. 154(b) by 128 days.

(21) Appl. No.: 10/507,906

(22) PCT Filed: Mar. 10, 2003

(86) PCT No.: PCT/JP03/02767

§ 371 (c)(1), (2), (4) Date: Sep. 16, 2004

(87) PCT Pub. No.: WO03/078484

PCT Pub. Date: Sep. 25, 2003

(65) Prior Publication Data

US 2005/0159571 A1 Jul. 21, 2005

(30) Foreign Application Priority Data

Mar. 18, 2002 (JP) ............................. 2002-073422

(51) Int. Cl.
  *C08F 2/44* (2006.01)
(52) U.S. Cl. .................. 526/317.1; 526/79; 526/319
(58) Field of Classification Search .................. 526/78, 526/79, 317.1, 319
See application file for complete search history.

(56) References Cited

U.S. PATENT DOCUMENTS

| 2,923,692 | A | * | 2/1960 | Ackerman et al. ........... 524/548 |
| 2,958,679 | A | | 11/1960 | Jones et al. |
| 3,426,004 | A | | 2/1969 | Wagner |
| 3,915,921 | A | | 10/1975 | Schlatzer, Jr. |
| 4,267,103 | A | * | 5/1981 | Cohen ........................ 524/773 |
| 4,509,949 | A | | 4/1985 | Huang et al. |
| 4,927,738 | A | * | 5/1990 | Iwanaga et al. ........... 430/286.1 |
| 4,985,513 | A | | 1/1991 | Iwanaga et al. |
| 4,996,274 | A | | 2/1991 | Hsu |
| 5,342,911 | A | | 8/1994 | Bresciani |
| 5,629,395 | A | * | 5/1997 | Fujikake et al. ........... 526/238.23 |
| 5,663,253 | A | | 9/1997 | Russo et al. |

FOREIGN PATENT DOCUMENTS

| EP | 0 739 912 A2 | 10/1996 |
| JP | 47-13775 B | 4/1972 |
| JP | 47-13775 B1 | 4/1972 |
| JP | 56-120717 A | 9/1981 |
| JP | 56-120717 A | 9/1981 |
| JP | 58-084819 A | 5/1983 |
| JP | 60-192718 A | 1/1985 |
| JP | 60-12361 B2 | 4/1985 |
| JP | 60-192718 A | 10/1985 |
| JP | 63-162712 A | 7/1988 |
| JP | 2-62561 B2 | 12/1990 |
| JP | 5-132657 A | 5/1993 |
| JP | 5-39966 B2 | 6/1993 |
| JP | 6-107720 A | 4/1994 |
| JP | 11-302310 A | 2/1999 |
| JP | 11-302310 A | 11/1999 |
| JP | 2002-97205 A | 4/2002 |

* cited by examiner

*Primary Examiner*—Randy Gulakowski
*Assistant Examiner*—Michael M Bernshteyn
(74) *Attorney, Agent, or Firm*—Birch, Stewart, Kolasch & Birch, LLP

(57) ABSTRACT

A process for preparing a water-soluble carboxyl group-containing polymer comprising reacting an α,β-unsaturated carboxylic acid with a compound having at least two ethylenically unsaturated groups in an inert solvent in the presence of a radical polymerization initiator, the process for preparing a water-soluble carboxyl group-containing polymer being characterized in that the α,β-unsaturated carboxylic acid is further added to a reaction mixture in which 20 to 70% by mol of an unreacted α,β-unsaturated carboxylic acid remains, and the α,β-unsaturated carboxylic acid is reacted with the compound having at least two ethylenically unsaturated groups; and a water-soluble carboxyl group-containing polymer obtainable by the above-mentioned process, wherein the reducing ratio of viscosity of a 0.2% by weight neutralized viscous liquid is less than 25%, and the equilibrium viscosity of the neutralized viscous liquid is 20000 to 50000 mPa·s. The water-soluble carboxyl group-containing polymer obtainable by the present invention can be suitably used as a thickener for cosmetics and the like, a moisturizer for poultices and the like, an emulsifier, or a suspension stabilizer for suspensions, and the like.

8 Claims, No Drawings

PROCESS FOR PRODUCING WATER-SOLUBLE CARBOXYLATED POLYMER

TECHNICAL FIELD

The present invention relates to a process for preparing a water-soluble carboxyl group-containing polymer. More specifically, the present invention relates to a process for preparing a water-soluble carboxyl group-containing polymer which can be suitably used as a thickener for cosmetics and the like, a moisturizer for poultices and the like, an emulsifier, or a suspension stabilizer for suspensions, and the like.

BACKGROUND ART

As a water-soluble carboxyl group-containing polymer, there have been known, for instance, a copolymer of an α,β-unsaturated carboxylic acid such as acrylic acid and a polyallyl ether (U.S. Pat. No. 2,923,692); a copolymer of an α,β-unsaturated carboxylic acid and hexaallyl trimethylene trisulfone (U.S. Pat. No. 2,958,679); a copolymer of an α,β-unsaturated carboxylic acid and triallyl phosphate (U.S. Pat. No. 3,426,004); a copolymer of an α,β-unsaturated carboxylic acid and glycidyl methacrylate (Japanese Patent Laid-Open No. Sho 58-84819); a copolymer of an α,β-unsaturated carboxylic acid such as acrylic acid and pentaerythritol allyl ether (U.S. Pat. No. 5,342,911, No. 5,663,253 and No. 4,996,274); a copolymer of an α,β-unsaturated carboxylic acid such as acrylic acid, a (meth)acrylic acid ester and pentaerythritol allyl ether (Japanese Examined Patent Publication No. Hei 5-39966 and No. Sho 60-12361); and the like. These water-soluble carboxyl group-containing polymers have been used for uses such as a thickener for cosmetics, a moisturizer for poultices and the like, an emulsifier, or a suspension stabilizer for suspensions and the like, after these water-soluble carboxyl group-containing polymers are dissolved in water and the solution is neutralized with an alkali, to give a neutralized viscous liquid.

In order to use the above-mentioned water-soluble carboxyl group-containing polymer for these uses, it is necessary to prepare a neutralized viscous liquid by firstly preparing a homogeneous aqueous solution of the water-soluble carboxyl group-containing polymer, and thereafter neutralizing the aqueous solution with an alkali. However, since the above-mentioned water-soluble carboxyl group-containing polymer is usually in the form of fine powder, a lump of powder tends to be formed when the polymer is dissolved in water. Once the lump of powder is formed, a gel-like layer is formed on the surface of the lump. Therefore, there is a defect that the speed of penetrating water into the interior of the lump is delayed, thereby making it difficult to obtain a homogeneous aqueous solution.

Therefore, when the aqueous solution of the water-soluble carboxyl group-containing polymer is prepared, there is necessitated a procedure with a poor production efficiency such that powder of the water-soluble carboxyl group-containing polymer is gradually added to water under high-speed agitation in order to prevent the formation of the lump of powder. In some cases, there is necessitated a specialized dissolution apparatus in order to prevent the formation of the lump of powder.

On the other hand, in the field of cosmetics and the like, the above-mentioned water-soluble carboxyl group-containing polymer is dissolved under a high-speed agitation, and thereafter the solution is neutralized with an alkali to give a neutralized viscous liquid, and a high-speed agitation is further continuously carried out in order to obtain a smoother gel appearance of a neutralized viscous liquid. However, when the high-speed agitation is maintained for a long period of time, the viscosity of the neutralized viscous liquid is reduced due to shearing during the agitation. Therefore, there is a defect that the above-mentioned water-soluble carboxyl group-containing polymer has to be used in a large amount for obtaining the same thickening effect.

An object of the present invention is to provide a process for preparing a water-soluble carboxyl group-containing polymer showing a small reducing ratio of viscosity when prepared its neutralized viscous liquid and a high viscosity even at a low concentration, and being excellent in transparency and gel appearance (surface smoothness).

These and other objects of the present invention will be apparent from the following description.

DISCLOSURE OF INVENTION

The present invention relates to:

[1] a process for preparing a water-soluble carboxyl group-containing polymer comprising reacting an α,β-unsaturated carboxylic acid with a compound having at least two ethylenically unsaturated groups in an inert solvent in the presence of a radical polymerization initiator, the process for preparing a water-soluble carboxyl group-containing polymer being characterized in that the α,β-unsaturated carboxylic acid is further added to a reaction mixture in which 20 to 70% by mol of an unreacted α,β-unsaturated carboxylic acid remains, and the α,β-unsaturated carboxylic acid is reacted with the compound having at least two ethylenically unsaturated groups; and

[2] a water-soluble carboxyl group-containing polymer obtainable by the process of the above-mentioned [1], wherein the reducing ratio of viscosity of a 0.2% by weight neutralized viscous liquid is less than 25%, and the equilibrium viscosity of the neutralized viscous liquid is 20000 to 50000 mPa·s.

BEST MODE FOR CARRYING OUT THE INVENTION

There is the greatest feature in the process for preparing a water-soluble carboxyl group-containing polymer of the present invention, that the process for preparing a water-soluble carboxyl group-containing polymer comprises reacting an α,β-unsaturated carboxylic acid with a compound having at least two ethylenically unsaturated groups in an inert solvent in the presence of a radical polymerization initiator, and that the α,β-unsaturated carboxylic acid is further added to a reaction mixture in which 20 to 70% by mol of an unreacted α,β-unsaturated carboxylic acid remains, and the α,β-unsaturated carboxylic acid is reacted with the compound having at least two ethylenically unsaturated groups.

The α,β-unsaturated carboxylic acids used in the present invention are not limited to specified ones, and include, for instance, α,β-unsaturated carboxylic acids such as acrylic acid, methacrylic acid, crotonic acid, maleic acid, itaconic acid and fumaric acid; alkyl esters of the α,β-unsaturated carboxylic acids having an alkyl group of 10 to 30 carbon atoms, such as lauryl acrylate, myristyl acrylate, palmityl acrylate, oleyl acrylate, stearyl acrylate, behenyl acrylate, lauryl methacrylate, myristyl methacrylate, palmityl methacrylate, oleyl methacrylate, stearyl methacrylate and behenyl acrylate; and the like. These can be used alone as the α,β-unsaturated carboxylic acid, or the α,β-unsaturated carboxylic acid and the alkyl ester of the α,β-unsaturated carboxylic acid having an alkyl group of 10 to 30 carbon atoms can be simultaneously used. Among them, acrylic acid alone, or a mixture of acrylic acid and lauryl methacrylate is favorably used because it is inexpensive and readily available and gives excellent transparency to the neutralized viscous liquid of the water-soluble carboxyl group-containing polymer.

It is desired that the amount of the $\alpha,\beta$-unsaturated carboxylic acid used in the initial reaction is 6 to 25 parts by volume, preferably 8 to 22 parts by volume, more preferably 13 to 20 parts by volume based on 100 parts by volume of the inert solvent described later. It is preferable that the amount of the $\alpha,\beta$-unsaturated carboxylic acid is at least 6 parts by volume from the viewpoint of giving excellent transparency to the neutralized viscous liquid of the resulting water-soluble carboxyl group-containing polymer. Also, the amount of the $\alpha,\beta$-unsaturated carboxylic acid is at most 25 parts by volume from the viewpoint that the mixture can be homogeneously agitated even if the water-soluble carboxyl group-containing polymer is precipitated as the reaction proceeds.

The compound having at least two ethylenically unsaturated groups used in the present invention is not limited to specified ones, and includes, for instance, acrylates of polyols having at least two substituted groups such as ethylene glycol, propylene glycol, polyoxyethylene glycol, polyoxypropylene glycol, glycerol, polyglycerol, trimethylolpropane, pentaerythritol, saccharose and sorbitol; methacrylates of polyols having at least two substituted groups; allyl ethers of these polyols having at least two substituted groups; diallyl phthalate, triallyl phosphate, allyl methacrylate, tetraallyloxyethane, triallyl cyanurate, divinyl adipate, vinyl crotonate, 1,5-hexadiene, divinylbenzene, and the like. Among them, pentaerythritol tetraallyl ether, diethylene glycol diallyl ether or polyallyl saccharose is favorably used from the viewpoint of being capable of obtaining a neutralized viscous liquid of the water-soluble carboxyl group-containing polymer having high viscosity, and giving high suspension stability to an emulsion, a suspension or the like.

It is desired that the amount of the compound having at least two ethylenically unsaturated groups used is 0.15 to 2 parts by weight, preferably 0.3 to 1.5 parts by weight based on 100 parts by weight of the initial $\alpha,\beta$-unsaturated carboxylic acid. It is preferable that the amount of the compound having at least two ethylenically unsaturated groups used is at least 0.15 parts by weight from the viewpoint of prevention from reducing viscosity of the neutralized viscous liquid of the resulting water-soluble carboxyl group-containing polymer. Also, it is preferable that the amount of the compound having at least two ethylenically unsaturated groups used is at most 2 parts by weight from the viewpoint of preventing the formation of an insoluble gel in the neutralized viscous liquid of the resulting water-soluble carboxyl group-containing polymer.

The radical polymerization initiator usable in the present invention is not limited to specified ones, and includes, for instance, $\alpha,\alpha'$-azobisisobutyronitrile, 2,2'-azobis-2,4-dimethylvaleronitrile, dimethyl-2,2'-azobisisobutyrate, benzoyl peroxide, lauroyl peroxide, cumene hydroperoxide, tertiary butyl hydroperoxide, and the like. Among them, $\alpha,\alpha'$-azobisisobutyronitrile is preferable from the viewpoint of being easy to handle and excellent in stability.

It is desired that the amount of the radical polymerization initiator used is 0.003 to 0.20 mol based on 100 mol of the initial $\alpha,\beta$-unsaturated carboxylic acid. It is preferable that the amount of the radical polymerization initiator used is at least 0.003 mol based on 100 mol of the initial $\alpha,\beta$-unsaturated carboxylic acid, from the viewpoint of maintaining an appropriate reaction rate and being economical. It is preferable that the amount of the radical polymerization initiator used is at most 0.20 mol based on 100 mol of the initial $\alpha,\beta$-unsaturated carboxylic acid, from the viewpoint that heat removal is simplified without rapidly progressing the polymerization, and that the reaction control is facilitated.

The inert solvent as used herein refers to a solvent which dissolves the $\alpha,\beta$-unsaturated carboxylic acids and the compound having at least two ethylenically unsaturated groups but does not dissolve the water-soluble carboxyl group-containing polymer obtained.

The inert solvent includes, for instance, normal pentane, normal hexane, isohexane, normal heptane, normal octane, isooctane, cyclopentane, methylcyclopentane, cyclohexane, methylcyclohexane, benzene, toluene, xylene, chlorobenzene, ethylene dichloride, ethyl acetate, isopropyl acetate, methyl ethyl ketone, methyl isobutyl ketone, and the like. These can used alone or in admixture of at least two kinds. Among them, normal hexane is favorably used from the viewpoint of having relatively low influence to human bodies and being inexpensive and readily available.

When the $\alpha,\beta$-unsaturated carboxylic acid is reacted with the compound having at least two ethylenically unsaturated groups, it is preferable that the reaction is carried out in the presence of an alkali metal carbonate together with the radical polymerization initiator. When the $\alpha,\beta$-unsaturated carboxylic acid is reacted with the compound having at least two ethylenically unsaturated groups in the presence of the alkali metal carbonate together with the radical polymerization initiator as described above, the gel appearance of the neutralized viscous liquid of the resulting water-soluble carboxyl group-containing polymer can be improved.

The alkali metal carbonate includes sodium carbonate, potassium carbonate, sodium hydrogencarbonate, potassium hydrogencarbonate, and the like. Among them, sodium carbonate and potassium carbonate are favorably used from the viewpoint that the reduction of the viscosity of the neutralized viscous liquid of the resulting water-soluble carboxyl group-containing polymer is small.

It is desired that the amount of the alkali metal carbonate used is 0.001 to 1 part by weight based on 100 parts by weight of the initial $\alpha,\beta$-unsaturated carboxylic acid. It is preferable that the amount of the alkali metal carbonate used is at least 0.001 parts by weight from the viewpoint of being capable of improving the gel appearance of the neutralized viscous liquid of the resulting water-soluble carboxyl group-containing polymer. Also, it is preferable that the amount of the alkali metal carbonate used is at most 1 part by weight from the viewpoint of maintaining the viscosity of the neutralized viscous liquid of the resulting water-soluble carboxyl group-containing polymer.

When the $\alpha,\beta$-unsaturated carboxylic acid is reacted with the compound having at least two ethylenically unsaturated groups, it is preferable that the atmosphere is, for instance, an atmosphere of an inert gas such as nitrogen gas or argon gas.

It is desired that the reaction temperature is 50° to 90° C., preferably 55° to 75° C. It is preferable that the reaction temperature is at least 50° C. from the viewpoint of suppressing the increase of the viscosity of the reaction mixture so that the reaction mixture can be agitated homogeneously. Also, it is preferable that the reaction temperature is at most 90° C. from the viewpoint of being capable of controlling the reaction without rapidly progressing the reaction. The reaction time cannot be absolutely determined because the reaction time differs depending upon the reaction temperature. The reaction time is usually 0.5 to 5 hours.

As mentioned above, in the present invention, the greatest feature resides in that the $\alpha,\beta$-unsaturated carboxylic acid is further added to a reaction mixture in which 20 to 70% by mol, preferably 30 to 60% by mol, more preferably 30 to 50% by mol of the unreacted α,β-unsaturated carboxylic acid used in the initial reaction mixture remains, and the α,β-unsaturated carboxylic acid is reacted with the compound having at least two ethylenically unsaturated groups. The amount of the unreacted α,β-unsaturated carboxylic acid is at least 20% by mol of the α,β-unsaturated carboxylic acid used in the initial reaction mixture from the viewpoint of making the reducing ratio of viscosity of the neutralized viscous liquid of the resulting water-soluble carboxyl group-containing polymer small. Also, similarly, the amount of the unreacted α,β-unsaturated carboxylic acid is at most 70% by mol of the α,β-unsaturated carboxylic acid used in the initial reaction mixture from the viewpoint of making the reducing ratio of viscosity of the neutralized viscous liquid of the resulting water-soluble carboxyl group-containing polymer small. Here, the unreacted α,β-unsaturated carboxylic acid can be determined by measuring the amount of the α,β-unsaturated carboxylic acid remaining in the reaction mixture with high-performance liquid chromatography.

The α,β-unsaturated carboxylic acid to be added may be the same compound as or a different compound from the initial α,β-unsaturated carboxylic acid, and includes, for instance, α,β-unsaturated carboxylic acids such as acrylic acid, methacrylic acid, crotonic acid, maleic acid, itaconic acid, fumaric acid; alkyl esters of the α,β-unsaturated carboxylic acids having an alkyl group of 10 to 30 carbon atoms, such as lauryl acrylate, myristyl acrylate, palmityl acrylate, oleyl acrylate, stearyl acrylate, behenyl acrylate, lauryl methacrylate, myristyl methacrylate, palmityl methacrylate, oleyl methacrylate, stearyl methacrylate and behenyl acrylate; and the like. These can be used alone as the α,β-unsaturated carboxylic acid, or the α,β-unsaturated carboxylic acid and the alkyl ester of the α,β-unsaturated carboxylic acid having an alkyl group of 10 to 30 carbon atoms can be simultaneously used. Among them, acrylic acid alone, or a mixture of acrylic acid and lauryl methacrylate is favorably used because it is inexpensive and readily available and gives excellent transparency to the neutralized viscous liquid of the water-soluble carboxyl group-containing polymer.

It is desired that the amount of the α,β-unsaturated carboxylic acid added is 3 to 60% by weight, preferably 5 to 50% by weight, more preferably 10 to 40% by weight of the amount of the initial α,β-unsaturated carboxylic acid. It is preferable that the amount of the α,β-unsaturated carboxylic acid added is at least 3% by weight from the viewpoint of obtaining a water-soluble carboxyl group-containing polymer which gives a neutralized viscous liquid having a small reducing ratio of viscosity and being excellent in thickening property even at a low concentration and transparency. Also, it is preferable that the amount of the α,β-unsaturated carboxylic acid added is at most 60% by weight from the viewpoint that the mixture can be homogeneously agitated even if the water-soluble carboxyl group-containing polymer is precipitated as the reaction proceeds.

The α,β-unsaturated carboxylic acid may be added at a time, or in plural divided portions.

It is desired that the reaction temperature is 50° to 90° C., preferably 55° to 75° C. when the α,β-unsaturated carboxylic acid is added to react. In other words, the α,β-unsaturated carboxylic acid can be further added at the temperature at which the α,β-unsaturated carboxylic acid is firstly reacted with the compound having at least two ethylenically unsaturated groups in an inert solvent in the presence of a radical polymerization initiator. The reaction time after the addition cannot be absolutely determined because the reaction time differs depending upon the reaction temperature. The reaction time is usually 0.5 to 5 hours.

After the termination of the reaction, white fine powder of the water-soluble carboxyl group-containing polymer can be obtained by heating the reaction mixture to 80° to 130° C. to remove the inert solvent by evaporation. It is preferable that the heating temperature is at least 80° C. from the viewpoint of being capable of drying in a short period of time. Also, it is preferable that the heating temperature is at most 130° C. from the viewpoint of being excellent in solubility of the resulting water-soluble carboxyl group-containing polymer.

It is desired that the reducing ratio of viscosity of a 0.2% by weight neutralized viscous liquid of the water-soluble carboxyl group-containing polymer thus obtained is less than 25%, preferably less than 15%. It is preferable that the reducing ratio of viscosity of the 0.2% by weight neutralized viscous liquid is less than 25% from the viewpoint of being capable of securing stable thickening property when cosmetics and the like are produced, and suppressing variance in quality in industrial production. The reducing ratio of viscosity in the present invention refers to a value determined by the determination method described later.

In addition, it is desired that the equilibrium viscosity of a 0.2% by weight neutralized viscous liquid of the water-soluble carboxyl group-containing polymer of the present invention is 20000 to 50000 mPa·s, preferably 25000 to 40000 mPa·s. It is preferable that the equilibrium viscosity is at least 20000 mPa·s from the viewpoint of being economical without increasing the amount of the water-soluble carboxyl group-containing polymer used for securing the same thickening property. Also, it is preferable that the equilibrium viscosity is at most 50000 mPa·s from the viewpoint that the amount of the water-soluble carboxyl group-containing polymer used is appropriate for securing the same thickening property, and that the neutralized viscous liquid has a long-term stability against a salt or light. The equilibrium viscosity in the present invention refers to a value determined by the determination method described later.

The process for preparing a neutralized viscous liquid using the resulting water-soluble carboxyl group-containing polymer is not limited to specified ones. For instance, the water-soluble carboxyl group-containing polymer is dissolved in water so as to have a concentration of the polymer of 0.01 to 3% by weight, and thereafter the solution is neutralized with an alkali such as an alkali metal hydroxide such as sodium hydroxide, or an amine such as triethanolamine or diisopropanolamine so as to have a pH of 6.5 to 7.5.

The neutralized viscous liquid obtained by using the water-soluble carboxyl group-containing polymer of the present invention is less likely to be subjected to shearing during agitation and has a small reducing ratio of viscosity. Also, since this neutralized viscous liquid has a high viscosity even at a low concentration and is excellent in transparency and gel appearance, the properties of cosmetics and the like can be well maintained.

The reason why the water-soluble carboxyl group-containing polymer obtained by the process of the present invention has excellent properties as described above are not explicit. The reason can be presumed to be as follows: Specifically, in an ordinary process, there is obtained a water-soluble carboxyl group-containing polymer having a three-dimensional structure in which polymer chains grown from many cross-linking points are entangled. On the other hand, according to the process of the present invention, it is thought that there is obtained by further adding the α,β-unsaturated carboxylic acid, which is a monomer, at a specific polymerization stage, a water-soluble carboxyl group-containing polymer having a three-dimensional structure in which new polymer chains are entangled on the surface of the three-dimensional structure in which polymer chains grown from the above-mentioned many cross-linking points are entangled. Therefore, it is thought that the reducing the viscosity of the neutralized viscous liquid which is caused by loosening the polymer chains entangled to each other due to shearing during the agitation is less likely to take place, and that the neutralized viscous liquid has a high viscosity even at a low concentration.

The present invention will be explained more specifically hereinbelow by means of examples and comparative examples, without intending to limit the present invention only to these examples.

EXAMPLE 1

A 500 mL four-neck flask equipped with a stirrer, a thermometer, a nitrogen gas inlet tube and a condenser tube was charged with 40 g (0.56 mol, 38.1 mL) of acrylic acid, 0.2 g (0.0008 mol) of lauryl methacrylate, 0.08 g of sodium carbonate, 0.25 g of pentaerythritol tetraallyl ether, 0.16 g (0.001 mol) of $\alpha,\alpha'$-azobisisobutyronitrile and 177 g (264 mL) of n-hexane. Subsequently, the mixture was homogenously mixed with stirring, and thereafter nitrogen gas was blown into the solution in order to remove oxygen existing in the upper space of the flask, the starting materials and the solvent. Next, the temperature of the mixture was kept at 60° to 65° C. for 1 hour under nitrogen atmosphere to react. The total amount of unreacted acrylic acid and lauryl methacrylate in the reaction mixture at that time was 0.230 mol and 41% by mol of the total amount of charged acrylic acid and lauryl methacrylate.

Subsequently, 10 g (0.14 mol, 9.5 mL) of acrylic acid was added thereto at the same temperature, and the mixture was reacted for 3 hours at the same temperature.

After the termination of the reaction, the resulting slurry was heated to 90° C. to distill off n-hexane, to give 48 g of a water-soluble carboxyl group-containing polymer in the form of fine white powder.

EXAMPLE 2

A 500 mL four-neck flask equipped with a stirrer, a thermometer, a nitrogen gas inlet tube and a condenser tube was charged with 40 g (0.56 mol, 38.1 mL) of acrylic acid, 0.08 g of potassium carbonate, 0.48 g of diethylene glycol diallyl ether, 0.16 g (0.001 mol) of $\alpha,\alpha'$-azobisisobutyronitrile and 177 g (264 mL) of n-hexane. Subsequently, the mixture was homogenously mixed with stirring, and thereafter nitrogen gas was blown into the solution in order to remove oxygen existing in the upper space of the flask, the starting materials and the solvent. Next, the temperature of the mixture was kept at 60° to 65° C. for 1.5 hours under nitrogen atmosphere to react. The amount of unreacted acrylic acid in the reaction mixture at that time was 0.174 mol and 31% by mol of the amount of charged acrylic acid.

Subsequently, 10 g (0.14 mol, 9.5 mL) of acrylic acid was added thereto at the same temperature, and the mixture was reacted for 2.5 hours at the same temperature.

After the termination of the reaction, the resulting slurry was heated to 90° C. to distill off n-hexane, to give 48 g of a water-soluble carboxyl group-containing polymer in the form of fine white powder.

EXAMPLE 3

A 500 mL four-neck flask equipped with a stirrer, a thermometer, a nitrogen gas inlet tube and a condenser tube was charged with 40 g (0.56 mol, 38.1 mL) of acrylic acid, 0.2 g (0.0008 mol) of lauryl methacrylate, 0.08 g of sodium carbonate, 0.25 g of pentaerythritol tetraallyl ether, 0.16 g (0.001 mol) of $\alpha,\alpha'$-azobisisobutyronitrile and 177 g (264 mL) of n-hexane. Subsequently, the mixture was homogenously mixed with stirring, and thereafter nitrogen gas was blown into the solution in order to remove oxygen existing in the upper space of the flask, the starting materials and the solvent. Next, the temperature of the mixture was kept at 60° to 65° C. for 1 hour under nitrogen atmosphere to react. The total amount of unreacted acrylic acid and lauryl methacrylate in the reaction mixture at that time was 0.230 mol and 41% by mol of the total amount of charged acrylic acid and lauryl methacrylate.

Subsequently, 16 g (0.22 mol, 15.2 mL) of acrylic acid was added thereto at the same temperature, and the mixture was reacted for 3 hours at the same temperature.

After the termination of the reaction, the resulting slurry was heated to 90° C. to distill off n-hexane, to give 55 g of a water-soluble carboxyl group-containing polymer in the form of fine white powder.

EXAMPLE 4

A 500 mL four-neck flask equipped with a stirrer, a thermometer, a nitrogen gas inlet tube and a condenser tube was charged with 40 g (0.56 mol, 38.1 mL) of acrylic acid, 0.25 g of pentaerythritol tetraallyl ether, 0.16 g (0.001 mol) of $\alpha,\alpha'$-azobisisobutyronitrile and 177 g (264 mL) of n-hexane. Subsequently, the mixture was homogenously mixed with stirring, and thereafter nitrogen gas was blown into the solution in order to remove oxygen existing in the upper space of the flask, the starting materials and the solvent. Next, the temperature of the mixture was kept at 60° to 65° C. for 1.5 hours under nitrogen atmosphere to react. The amount of unreacted acrylic acid in the reaction mixture at that time was 0.174 mol and 31% by mol of the amount of charged acrylic acid.

Subsequently, 10 g (0.14 mol, 9.5 mL) of acrylic acid was added thereto at the same temperature, and the mixture was reacted for 2.5 hours at the same temperature.

After the termination of the reaction, the resulting slurry was heated to 90° C. to distill off n-hexane, to give 48 g of a water-soluble carboxyl group-containing polymer in the form of fine white powder.

EXAMPLE 5

A 500 mL four-neck flask equipped with a stirrer, a thermometer, a nitrogen gas inlet tube and a condenser tube was charged with 40 g (0.56 mol, 38.1 mL) of acrylic acid, 0.2 g (0.0008 mol) of lauryl methacrylate, 0.25 g of pentaerythritol tetraallyl ether, 0.16 g (0.001 mol) of $\alpha,\alpha'$-azobisisobutyronitrile and 177 g (264 mL) of n-hexane. Subsequently, the mixture was homogenously mixed with stirring, and thereafter nitrogen gas was blown into the solution in order to remove oxygen existing in the upper space of the flask, the starting materials and the solvent. Next, the temperature of the mixture was kept at 60° to 65° C. for 2 hours under nitrogen atmosphere to react. The total amount of unreacted acrylic acid and lauryl methacrylate in the reaction mixture at that time was 0.118 mol and 21% by mol of the total amount of charged acrylic acid and lauryl methacrylate.

Subsequently, 10 g (0.14 mol, 9.5 mL) of acrylic acid was added thereto at the same temperature, and the mixture was reacted for 2 hours at the same temperature.

After the termination of the reaction, the resulting slurry was heated to 90° C. to distill off n-hexane, to give 48 g of a water-soluble carboxyl group-containing polymer in the form of fine white powder.

COMPARATIVE EXAMPLE 1

A 500 mL four-neck flask equipped with a stirrer, a thermometer, a nitrogen gas inlet tube and a condenser tube was charged with 40 g (0.56 mol, 38.1 mL) of acrylic acid, 0.08 g of sodium carbonate, 0.25 g of pentaerythritol tetraallyl ether, 0.16 g (0.001 mol) of α,α'-azobisisobutyronitrile and 177 g (264 mL) of n-hexane. Subsequently, the mixture was homogenously mixed with stirring, and thereafter nitrogen gas was blown into the solution in order to remove oxygen existing in the upper space of the flask, the starting materials and the solvent. Next, the temperature of the mixture was kept at 60° to 65° C. for 5 hours under nitrogen atmosphere to react.

After the termination of the reaction, the resulting slurry was heated to 90° C. to distill off n-hexane, to give 38 g of a water-soluble carboxyl group-containing polymer in the form of fine white powder.

COMPARATIVE EXAMPLE 2

A 500 mL four-neck flask equipped with a stirrer, a thermometer, a nitrogen gas inlet tube and a condenser tube was charged with 40 g (0.56 mol, 38.1 mL) of acrylic acid, 0.2 g (0.0008 mol) of lauryl methacrylate, 0.08 g of sodium carbonate, 0.25 g of pentaerythritol tetraallyl ether, 0.16 g (0.001 mol) of α,α'-azobisisobutyronitrile and 177 g (264 mL) of n-hexane. Subsequently, the mixture was homogenously mixed with stirring, and thereafter nitrogen gas was blown into the solution in order to remove oxygen existing in the upper space of the flask, the starting materials and the solvent. Next, the temperature of the mixture was kept at 60° to 65° C. for 0.5 hour under nitrogen atmosphere to react. The total amount of unreacted acrylic acid and lauryl methacrylate in the reaction mixture at that time was 0.404 mol and 72% by mol of the total amount of charged acrylic acid and lauryl methacrylate.

Subsequently, 2 g (0.03 mol, 1.9 mL) of acrylic acid was added thereto at the same temperature, and the mixture was reacted for 3.5 hours at the same temperature.

After the termination of the reaction, the resulting slurry was heated to 90° C. to distill off n-hexane, to give 40 g of a water-soluble carboxyl group-containing polymer in the form of fine white powder.

COMPARATIVE EXAMPLE 3

A 500 mL four-neck flask equipped with a stirrer, a thermometer, a nitrogen gas inlet tube and a condenser tube was charged with 40 g (0.56 mol, 38.1 mL) of acrylic acid, 0.2 g (0.0008 mol) of lauryl methacrylate, 0.08 g of sodium carbonate, 0.25 g of pentaerythritol tetraallyl ether, 0.16 g (0.001 mol) of α,α'-azobisisobutyronitrile and 177 g (264 mL) of n-hexane. Subsequently, the mixture was homogenously mixed with stirring, and thereafter nitrogen gas was blown into the solution in order to remove oxygen existing in the upper space of the flask, the starting materials and the solvent. Next, the temperature of the mixture was kept at 60° to 65° C. for 3.5 hours under nitrogen atmosphere to react. The total amount of unreacted acrylic acid and lauryl methacrylate in the reaction mixture at that time was 0.028 mol and 5% by mol of the total amount of charged acrylic acid and lauryl methacrylate.

Subsequently, 26 g (0.36 mol, 24.8 mL) of acrylic acid was added thereto at the same temperature, and the mixture was reacted for 3 hours at the same temperature.

After the termination of the reaction, the resulting slurry was heated to 90° C. to distill off n-hexane, to give 64 g of a water-soluble carboxyl group-containing polymer in the form of fine white powder.

As physical properties of the water-soluble carboxyl group-containing polymers obtained in Examples 1 to 5 and Comparative Examples 1 to 3, reducing ratio of viscosity, equilibrium viscosity, transparency and gel appearance of a 0.2% by weight neutralized viscous liquid of the water-soluble carboxyl group-containing polymer were evaluated in accordance with the following methods. The results are shown in Table 1.

(Evaluation of Physical Properties of Water-Soluble Carboxyl Group-Containing Polymer)

(1) Reducing Ratio of Viscosity and Equilibrium Viscosity

A 2-L glass beaker (diameter: 14 cm) was charged with 980 g of ion-exchanged water and 20 g of a water-soluble carboxyl group-containing polymer, and the mixture was agitated with a high-speed agitator (T.K. HOMO DISPER f model; manufactured by TOKUSHU KIKA KOGYO Co. Ltd.) at 5000 rotations per minute for 3 minutes to dissolve the water-soluble carboxyl group-containing polymer. The resulting solution was allowed to stand at 20° to 30° C. for 24 hours. Next, a 2-L glass beaker (diameter: 14 cm) was charged with 100 g of the above-mentioned solution which had been allowed to stand for 24 hours and 857 g of ion-exchanged water, and the mixture was agitated with the high-speed agitator at 2000 rotations per minute for 1 minute to homogenize the entire mixture. Subsequently, 43 g of a 2% by weight aqueous solution of potassium hydroxide was added thereto, at the same time, the rotational speed of the high-speed agitator was increased to 5000 rotations per minute, and the mixture was mixed with agitating for 2 minutes. The viscosity of the obtained 0.2% by weight neutralized viscous liquid (pH 6.8) was measured with a BL-type rotary viscometer under the conditions of Rotor No. 4, 12 rotations per minute and a temperature of 25° C. (viscosity after 2 minute-agitation) after 30 seconds passed. Further, the liquid was mixed with agitating in the same manner for 13 minutes, and the viscosity was measured (viscosity after 15 minute-agitation). Reducing ratio of viscosity was calculated from the measured values obtained in accordance with the following equation. Also, the equilibrium viscosity was defined as the above-mentioned viscosity after 15 minute-agitation.

[Reducing ratio of viscosity] = {[Viscosity after 2 minute-agitation −

Viscosity after 15 minute-agitation)÷

(Viscosity after 2 minute-agitation)]} × 100

(2) Transparency

A cell of 1 cm×1 cm was charged with the neutralized viscous liquid of the water-soluble carboxyl group-containing polymer, the viscosity of which had been measured after 15 minute-agitation, and the transmittance was measured at a wavelength of 425 nm. When the transmittance is at least 96%, the liquid can be usually evaluated to have excellent transparency.

(3) Gel Appearance

The gel appearance of the neutralized viscous liquid of the water-soluble carboxyl group-containing polymer was visually evaluated. The evaluation was made by a total of 10 male and female individuals as evaluation panelists, and the number of individuals of the panelists who had an excellent feel for the evaluation on the gel appearance of the neutralized viscous liquid was totaled, and judged on the bases of the following evaluation criteria. When the following judgment is at least ○ in the following evaluation criteria, the liquid can be usually evaluated to have an excellent gel appearance.

Evaluation Criteria

◎: the number of individuals who had a feel that the gel appearance of the neutralized viscous liquid is excellent being 10

○: the number of individuals who had a feel that the gel appearance of the neutralized viscous liquid is excellent being from 8 to 9

Δ: the number of individuals who had a feel that the gel appearance of the neutralized viscous liquid is excellent being at most 7

TABLE 1

| | Viscosity (mPa·s) Agitation Time | | Reducing Ratio of | | |
| --- | --- | --- | --- | --- | --- |
| | 2 minutes | 15 minutes | Viscosity (%) | Transmittance (%) | Gel Appearance |
| Ex. 1 | 35000 | 31000 | 11.4 | 98 | ◎ |
| Ex. 2 | 32000 | 27500 | 14.1 | 99 | ◎ |
| Ex. 3 | 32000 | 30000 | 6.3 | 99 | ◎ |
| Ex. 4 | 32500 | 28000 | 13.8 | 99 | ○ |
| Ex. 5 | 32200 | 25000 | 22.4 | 97 | ○ |
| Comp. Ex. 1 | 28000 | 19000 | 32.1 | 95 | Δ |
| Comp. Ex. 2 | 29500 | 20000 | 32.2 | 96 | ○ |
| Comp. Ex. 3 | 23000 | 15000 | 34.8 | 97 | Δ |

It can be seen from the results shown in Table 1 that the reducing ratio of viscosity of the 0.2% by weight neutralized viscous liquids of the water-soluble carboxyl group-containing polymers obtained in Examples 1 to 5 are less than 25%, and that the equilibrium viscosities thereof are within the range from 20000 to 50000 mPa·s. On the other hand, it can be seen that the reducing ratio of viscosity of the 0.2% by weight neutralized viscous liquids of the water-soluble carboxyl group-containing polymers obtained in Comparative Examples 1 to 3 are at least 25%, and that the equilibrium viscosities thereof are at most 20000 mPa·s. Also, it can be seen that the 0.2% by weight neutralized viscous liquids of the water-soluble carboxyl group-containing polymers obtained in Examples 1 to 5 have a high viscosity even at a low concentration and are excellent in transparency and gel appearance.

INDUSTRIAL APPLICABILILTY

The neutralized viscous liquid of the water-soluble carboxyl group-containing polymer obtained in the process of the present invention has a low reducing ratio of viscosity and a high viscosity even at a low concentration, and is excellent in transparency and gel appearance. Accordingly, the water-soluble carboxyl group-containing polymer obtained by the process of the present invention can be suitably used as a thickener for cosmetics and the like, a moisturizer for poultices and the like, an emulsifier, or a suspension stabilizer for suspensions and the like, as compared with conventional polymers.

It is obvious that there are various kinds of equivalents which fall into the same scope of the present invention described above. Such variations are not to be regarded as a departure from the purpose and scope of the invention, and all such modifications as would be obvious to those skilled in the art are intended to be included within the technological scope of the following claims.

The invention claimed is:

1. A process for preparing a water-soluble carboxyl group-containing polymer of which monomer composition consists essentially of an $\alpha,\beta$-unsaturated carboxylic acid and a compound having at least two ethylenically unsaturated groups, said process comprising
    reacting the $\alpha,\beta$-unsaturated carboxylic acid with the compound having at least two ethylenically unsaturated groups in an inert solvent in the presence of a radical polymerization initiator, said process for preparing a water-soluble carboxyl group-containing polymer being characterized in that the $\alpha,\beta$-unsaturated carboxylic acid is further added to a reaction mixture in which 20 to 70% by mol of an unreacted $\alpha,\beta$-unsaturated carboxylic acid remains, and the $\alpha,\beta$-unsaturated carboxylic acid is reacted with the compound having at least two ethylenically unsaturated groups,
    wherein the $\alpha,\beta$-unsaturated carboxylic acid is acrylic acid, or a mixture of acrylic acid and lauryl methacrylate, and wherein the compound having at least two ethylenically unsaturated groups is pentaerythritol tetraallyl ether, diethylene glycol diallyl ether or polyallyl saccharose.

2. The process according to claim 1, wherein the reaction is carried out in the presence of an alkali metal carbonate.

3. The process according to claim 2, wherein the alkali metal carbonate is sodium carbonate or potassium carbonate.

4. A water-soluble carboxyl group-containing polymer obtained by the process of any one of claims 1 to 3, wherein the reducing ratio of viscosity of a 0.2% by weight neutralized viscous liquid of the water-soluble carboxyl group-containing polymer is less than 25%, and the equilibrium viscosity of the neutralized viscous liquid is 20000 to 50000 mPa·s.

5. A process for preparing a water-soluble carboxylic group-containing polymer, said polymer being formed from monomers consisting essentially of a $\alpha,\beta$-unsaturated carboxylic acid and a compound having at least two ethylenically unsaturated groups, said process comprising:
    (a) reacting the $\alpha,\beta$-unsaturated carboxylic acid and the compound having at least two ethylenically unsaturated groups in an inert solvent in the presence of a radical polymerization initiator until a reaction mixture containing 20 to 70% by mol of unreacted $\alpha,\beta$-unsaturated carboxylic acid results; and
    (b) adding additional $\alpha,\beta$-unsaturated carboxylic acid to the reaction mixture obtained from (a) to react with the compound having at least two ethylenically unsaturated groups,
    wherein the $\alpha,\beta$-unsaturated carboxylic acid is acrylic acid, or a mixture of acrylic acid and lauryl methacrylate, and wherein the compound having at least two ethylenically unsaturated groups is pentaerythritol tetraallyl ether, diethylene glycol diallyl ether or polyallyl saccharose.

6. The process according to claim 5, wherein an initial reaction mixture of (a) comprises
   (1) 6 to 25 parts by volume of the α,β-unsaturated carboxylic acid based on 100 parts by volume of inert solvent, and
   (2) 0.15 to 2 parts by weight of the compound having at least two ethylenically unsaturated groups based on 100 parts by weight of initial α,β-unsaturated carboxylic acid.

7. The process according to claim 6, wherein the initial reaction mixture of (a) uses 8-22 parts by volume of the α,β-unsaturated carboxylic acid based on 100 parts by volume of inert solvent.

8. The process according to claim 6, wherein the initial reaction mixture of (a) uses 13-20 parts by volume of the α,β-unsaturated carboxylic acid based on 100 parts by volume of inert solvent.

* * * * *